(12) United States Patent
Harel

(10) Patent No.: US 6,543,194 B2
(45) Date of Patent: Apr. 8, 2003

(54) PRE-SHRUNK DRYWALL TRIM DEVICE

(75) Inventor: Kenneth N. Harel, Anaheim, CA (US)

(73) Assignee: Continuous Coating Corporation, Orange, CA (US)

( * ) Notice: Subject to any disclaimer, the term of this patent is extended or adjusted under 35 U.S.C. 154(b) by 0 days.

(21) Appl. No.: 09/862,094

(22) Filed: May 21, 2001

(65) Prior Publication Data

US 2002/0170251 A1 Nov. 21, 2002

(51) Int. Cl.⁷ ................................................ E04F 13/06
(52) U.S. Cl. .......................... 52/287.1; 52/288; 52/255
(58) Field of Search .............................. 52/287.1, 288.1, 52/254, 255

(56) References Cited

U.S. PATENT DOCUMENTS

| | | |
|---|---|---|
| 2,234,701 A | 3/1941 | Lyman |
| 2,590,846 A | 4/1952 | Cutting |
| 2,593,859 A | 4/1952 | Dunlap |
| 2,851,741 A | 9/1958 | Stemples |
| 2,862,264 A | 12/1958 | Perna |
| 2,904,856 A | 9/1959 | Robinson |
| 3,090,087 A | 5/1963 | Miller |
| 3,109,207 A | 11/1963 | Cooper |
| 3,660,200 A | 5/1972 | Anderson et al. |
| 4,031,596 A | 6/1977 | Joy |
| 4,624,087 A | 11/1986 | Schneller |
| 4,722,153 A | 2/1988 | Hardy |
| 4,863,774 A | 9/1989 | Tucker |
| 4,876,837 A | 10/1989 | Kelly et al. |
| 4,977,718 A | 12/1990 | Hoffman |
| 4,999,069 A | 3/1991 | Brackett et al. |
| 5,037,686 A | 8/1991 | Conboy |
| 5,048,247 A | 9/1991 | Weldy |
| 5,058,354 A | 10/1991 | Menchetti |
| 5,108,531 A | 4/1992 | Quadracci |
| 5,131,198 A | 7/1992 | Ritchie et al. |
| 5,238,720 A | 8/1993 | Volkman |
| 5,313,755 A | 5/1994 | Koenig |
| 5,314,584 A | 5/1994 | Grinnell et al. |
| 5,328,567 A | 7/1994 | Kinsley |
| 5,390,458 A | 2/1995 | Menchetti |
| 5,466,336 A | 11/1995 | Kinsley |
| 5,498,314 A | 3/1996 | Kinsley |
| 5,581,289 A | 12/1996 | Firl et al. |
| 5,613,335 A | 3/1997 | Rennich et al. |
| 5,645,862 A | 7/1997 | Sable et al. |
| 5,800,675 A | 9/1998 | Kinsley |
| 5,824,191 A | 10/1998 | Kinsley |
| 5,836,122 A | 11/1998 | Rennich et al. |
| 6,295,776 B1 * | 10/2001 | Kunz et al. .................. 52/255 |

FOREIGN PATENT DOCUMENTS

| | | |
|---|---|---|
| AU | 646843 | 3/1994 |
| AU | 59758/98 | 2/1998 |
| AU | 695482 | 8/1998 |
| AU | 55424/98 | 8/1998 |
| CA | 487518 | 10/1952 |
| CA | 553665 | 3/1958 |
| CA | 2237349 | 11/1998 |

OTHER PUBLICATIONS

Pages from CSM Bluenose catalog on Paper/Metal Drywall Trims.
Pages from Beadex catalog entitled Built For All The Corners Of The World on Commercial & Residential Drywall Trims.

* cited by examiner

*Primary Examiner*—Carl D. Friedman
*Assistant Examiner*—Brian E. Glessner
(74) *Attorney, Agent, or Firm*—Fulwider Patton Lee & Utecht, LLP

(57) ABSTRACT

A finish trim for use in dry wall construction having an elongated core that is configured with a flange having outwardly facing surfaces to which is affixed a pre-shrunk covering strip.

22 Claims, 4 Drawing Sheets

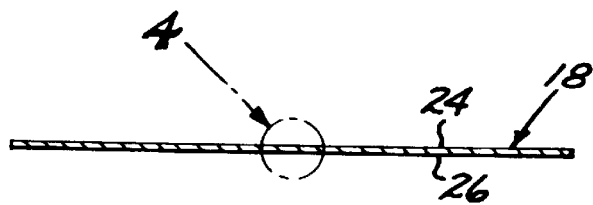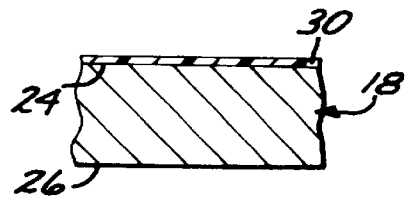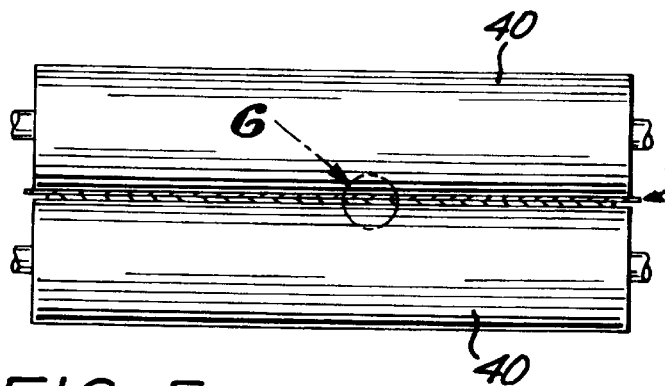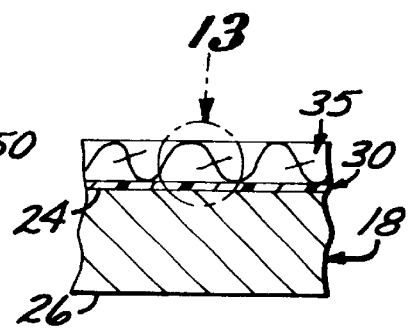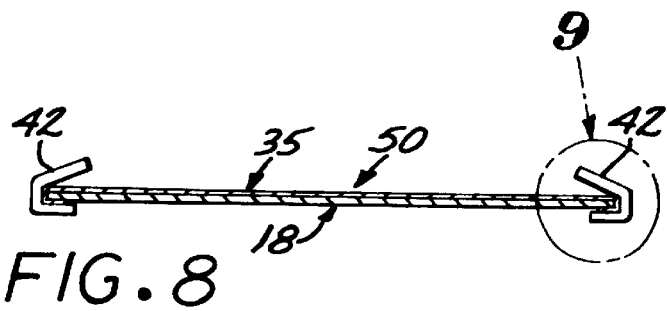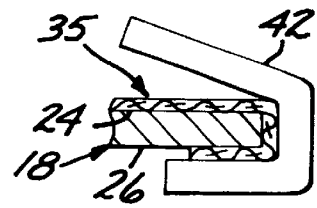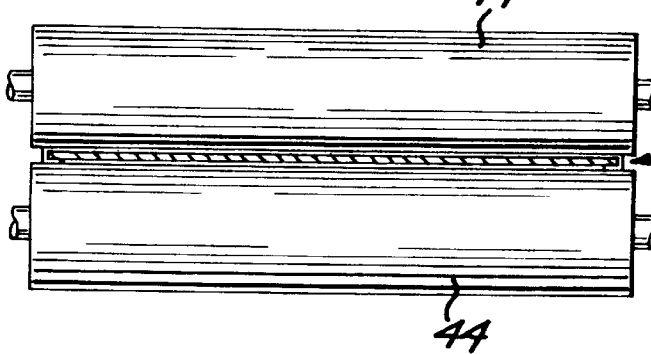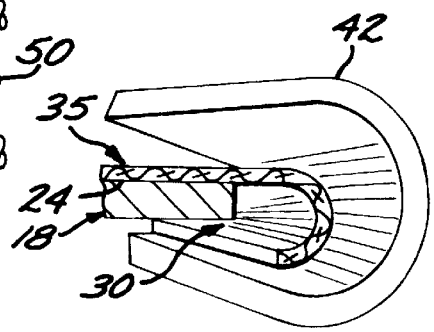

PRE-SHRUNK DRYWALL TRIM DEVICE

BACKGROUND OF THE INVENTION

1. Field of the Invention

The present invention relates to drywall finish trim devices typically utilized in finishing a drywall installation at a corner or terminus.

2. Description of the Prior Art

Drywall, sometimes also referred to as wallboard, is a staple in the construction industry as an economical alternative to joint compound for forming the interior walls and ceilings of rooms in residential, commercial, and industrial buildings. The materials used in drywall construction include gypsum board, plywood, fibre-and-pulp boards, and asbestos-cement boards. The large, rigid sheets are fastened directly to the frame of a building with nails, screws, or adhesives, or are mounted on furring (strips of wood nailed over the studs, joists, rafters, or masonry, which allow free circulation of air behind the interior wall). A significant advantage afforded by drywall construction is that it allows a builder to avoid the unnecessary delays attendant to the drying of wet plaster before other work can be started or before the on-site work required to achieve specific finishes may be completed. Wallboard is manufactured in both finished and unfinished forms, and finished wallboards may be faced with vinyl or other materials in a variety of permanent colors and textures so that they do not need to be painted when installed.

When employing drywall in construction, builders can easily cut the panels to any desired shape and size. However, workmen face a challenge in finishing drywall panels at an edge or corner. It is very difficult, if not impossible, to cut the edges of such panels with the precision, straightness, and smoothness that is required so that the abutted edges of adjoining panels form a straight corner that will afford an aesthetic finish. Additionally, cutting of the drywall panels exposes the soft, raw cores thereof, thus requiring some sort of covering to provide a finished appearance.

As a result, to cover drywall panel edges and enhance the aesthetics of a drywall joint, several devices and techniques may be employed in an effort to produce a structurally sound corner that will exhibit a smooth and seamless intersection. Devices proposed to achieve this result include drywall tape, trim and corner beads. When conventional drywall tape is used, it is applied to the joints and edges of abutting panels and is covered with wet joint compound that is feathered and smoothed to cover the newly created seams. When the joint compound has dried, the tape and drywall can be sanded, painted, covered, or otherwise finished in whatever manner is desired. A great deal of skill is required, however, to apply and form the joint compound to create a sufficiently straight intersection that will not exhibit, when taped and sanded to a finish, evidence of scuffing and tearing in the body of the tape.

In light of the limitations of drywall tape, trim strips or corner beads are often utilized in effort to produce a seamless and aesthetically pleasing edge trim or intersection at the corners of drywall panels.

Such trim may take many different forms such as a flat strip, a corner bead having flanges diverging at any one of a number of different angles, or a J strip to cap the edge of a dry wall panel. For the purposes of this invention, the particular angular configuration is not critical, but use in conjunction with numerous different configurations presently in existence and that may be developed in the future is contemplated. Further examples of corner trims include beads with perpendicular flanges, corner trims with a rib formed at the juncture of the flanges, flanges angled at 135° to one another, those configured with somewhat of a Z shape, those with soft line corners, and those with offsets or other configurations traditionally used in the trade and known to those skilled in the art.

To enhance the finished appearance of construction finished drywall with such trim, efforts have been made to cover a hard structural core with an exterior covering of paper or paper-like material to enhance the finished appearance. It is recognized that by covering a plastic or metal core with paper, the paper will serve to cooperate with the covering on adjacent drywall panels to, when covered with a joint compound, afford a continuous smooth appearance from such panels and over the resultant trimmed joint. The compound may be sanded down and feathered in effort to provide a continuous smooth surface.

A disadvantage arising from the use of such paper covered trim cores is that, during the sanding process, the workman sometimes sands through such compound and into the paper layer. This sanding tends to scuff up the fiber in the paper layer leaving somewhat of a scuffed or abraded surface, oftentimes with frayed fiber ends. This results in a discontinuous and unattractive surface. Efforts to solve this problem have led to the development of various different trims and corner beads that incorporate a protective layer constructed of either a strengthening compound or paper impregnated at the outer surface.

While these advancements may act to provide some strengthening to the covering paper, they do not adequately address the problem raised by sanding through the layer of material treated by the strengthening compound or the problems posed by separation of the paper from the core element with shrinkage of the paper cover. This issue becomes especially evident when trim strips or beads are subjected to high temperatures above about 100° F., as during storage in sheds, during transportation, or after prolonged exposure to various environmental conditions. In such instances, the paper covering will often shrink and bubble up on the core or pull away from it, particularly in any areas of any irregularity such as adjacent any shoulder or rib formed in such core. This bubbling and separation of the paper covering is often detected only at the construction site after the product has been transported and stored for preparation of the drywall phase of the construction project. Consequently, the onsite workman must oftentimes reject and discard any strips with such deteriorated trim resulting in significant waste of both product and time.

Consequently, there exists a need for a durable, affordable, and aesthetically pleasing corner bead device having a paper covering not susceptible to shrinkage or rupturing at elevated temperatures or after prolonged exposure to the environment.

SUMMARY OF THE INVENTION

The present invention provides for an improved drywall trim that resists surface cracking, bubbling, or rupturing and separation of the covering strip from the core element even at elevated temperatures. It is characterized by a protective core covering, preferably in the form of a stock paper covering strip that has been, while shrunk, bonded to the core. It is also contemplated that the cover strip may take the form of any durable fibrous covering strip that is well suited for use in such drywall construction applications. This covering strip may be specially manufactured for the present application, or may take the form of a commercially available material having the moisture evaporated therefrom to achieve a dehydrated shrunken state. The key requirement for the purposes of the present invention is that the material must be pre-shrunk and adhered to the core element in its pre-shrunk state.

During the manufacturing process, the covering paper or other suitable material defining the covering strip is pre-shrunk as by heating to an elevated temperature and maintained in that state as it is adhered to the core element of the bead. This heating may be accomplished by a variety of means, such as ovens or dryers, that are well known to those in the industry. The paper, in such a heated and pre-shrunk state, may then be mated to a metal or other suitable core material by using a hot melt glue or other appropriate bonding means. Then, when the trim device is cooled and rehydrated from atmospheric conditions, any tendency for such covering to expand relative to the core will result in relatively uniform application of expansive stress to such cover and the bond line. Then when such paper covering strip is subsequently exposed to high temperatures or dry conditions leading to dehydration and consequent shrinkage, the body of the covering will tend to shrink back from its expanded condition to a neutral condition and then to a contracted condition as it dehydrates below the dehydrated state it had at the time of bonding. This then results in application of much less stress to the bond line between such cover and the core than would be the case for a similar paper cover that had not been pre-shrunk.

The trim of the present invention can be made by selecting a fibrous covering strip, preferably in the form of a stock paper. The covering strip may be separately heated to dehydrate and shrink it. It may then be bonded in such a heated state by a layer of appropriate adhesive. Thusly configured, overhanging portions of the paper covering strip may be folded around and under the respectively covered edges of the core element, and/or the trim may be finished by forming it into a suitable shape for the desired application and cutting appropriately dimensioned segments therefrom.

Other objects and features of the invention will become apparent from consideration of the following description taken in conjunction with the accompanying drawing.

BRIEF DESCRIPTION OF THE DRAWINGS

FIG. 3 is a sectional view, in enlarged scale, of the covering strip adhered to the core element taken along line 3—3 in FIG. 1;

FIG. 4 is a transverse sectional view, in enlarged scale, taken from the circle designated 4 in FIG. 3;

FIG. 5 is a vertical sectional view, in enlarged scale, taken along line 5—5 of FIG. 1, depicting the bonded paper and core element passing through a pair of pinching rollers;

FIG. 6 is a sectional view, in enlarged scale, taken from the circle designated 6 in FIG. 5 depicting the paper covering strip bonded to the core element by an adhesive layer;

FIG. 7 is a sectional view, in enlarged scale, taken frm the location designated 7 in FIG. 1 and depicting the overlapping ends of the paper covering strip being folded under the core element as they pass through a folder;

FIG. 8 is a transverse sectional view, in enlarged scale, taken along line 7—7 of FIG. 1 depicting the paper covering strip being folded around the edges of the core element by the folder;

FIG. 9 is a sectional view, in enlarged scale, taken from the circle designated 9 in FIG. 8 depicting the paper covering strip as it as folded around and bonded to the core element;

FIG. 10 is a vertical sectional view, in enlarged scale, taken along line 10—10 of FIG. 1 and depicting the final bonding step wherein the paper covering strip and metallic core pass through a final set of pinching rollers;

DETAILED DESCRIPTION OF THE PREFERRED EMBODIMENTS

Paper covered drywall trim devices such as corner beads are one of the most popular methods for forming an even and aesthetically pleasing finish to drywall construction at terminus edges or joints such as corners by overlapping the marginal edges of drywall panels. It is desirable to form such trim devices with a hard core covered by a covering strip made from paper or some other suitable material to benefit from the rigidity of the core and the aesthetics afforded by constructing the trim with a cover material having characteristics similar to that of covering paper on the drywall panels to be trimmed. However, when thusly configured, such corner beads when exposed to heightened temperatures and dry conditions will experience shrinkage of the paper covering relative to the core, which often results in separation of the covering from the core or the formation of bubbles or ruptures in the covering itself. This phenomenon occurs due to variations in the characteristics of the paper that depend on the condition of the environment to which the paper is exposed. Such paper coverings are much more susceptible to unwanted internal structural changes based on changes in the surrounding environment than are the core elements, adhesives, and other such materials used in corner beads. I have discovered that surface treatment methods or the addition of strengthening compound to the outer extent of the paper are often inadequate to prevent this shrinkage and consequent deterioration of the trim itself. Therefore, at high temperatures and/or under extremely dry conditions, the paper cover strip may separate from the core, or be susceptible to bubbling or rupturing. The trim device and method of the present invention overcomes this shortcoming.

For the purpose of illustration, I will describe the drywall tin invention as an improved corner bead, generally designated 50, that is resistant to surface cracking, babbling, rupturing, and separation from the core at elevated temperatures or after prolonged use. More particularly, the invention includes a preshrunk strip 35 that is affixed to the facing surfaces of a hard core, generally designated 18, while maintained in its pre-shrunk state.

Figure 11:
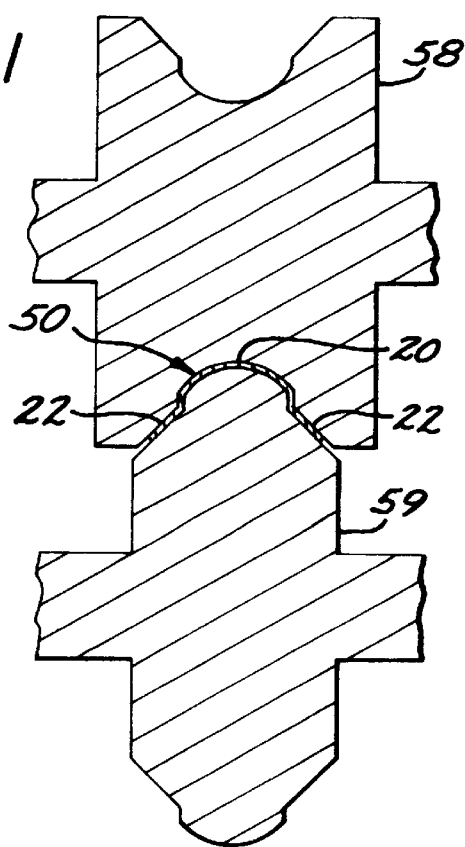
FIG. 11 is a vertical sectional view, in enlarged scale, taken along line 11—11 of FIG. 2, depicting a corner protector the bullnose or rounded corner embodiment as it is accordingly shaped by passing through a male and female forming roller.
Figure 12:
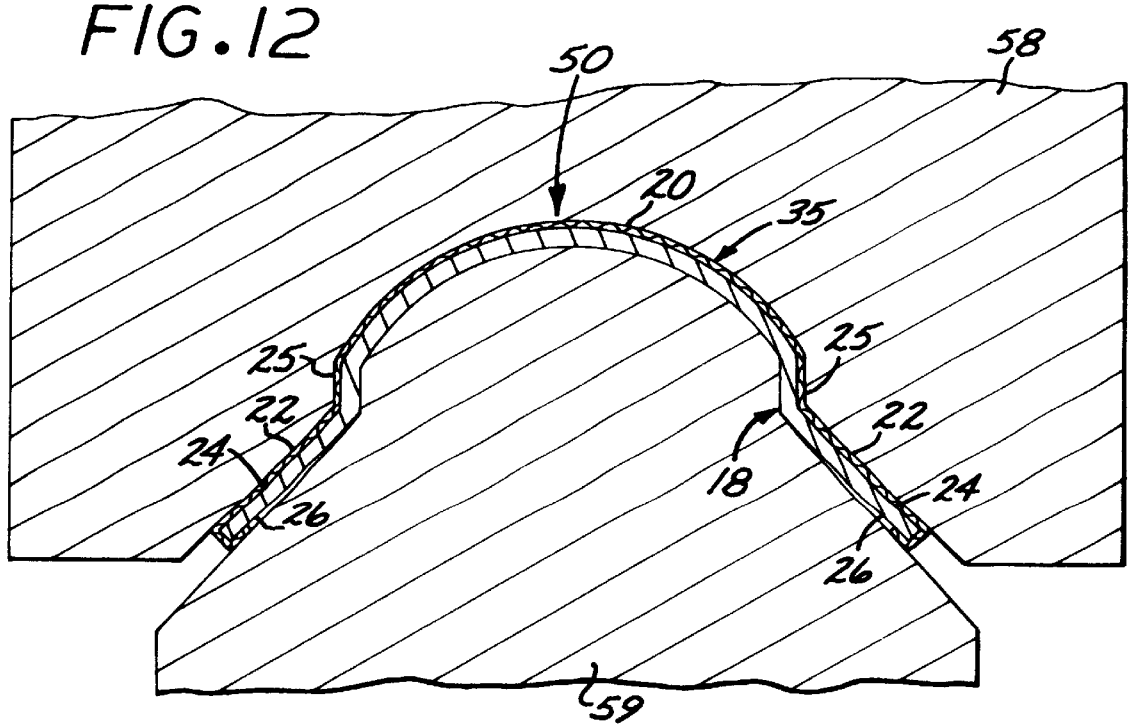
FIG. 12 is enlarged sectional view, similar to FIG. 1, taken along line 11—11 of FIG. 2.
Figure 14:
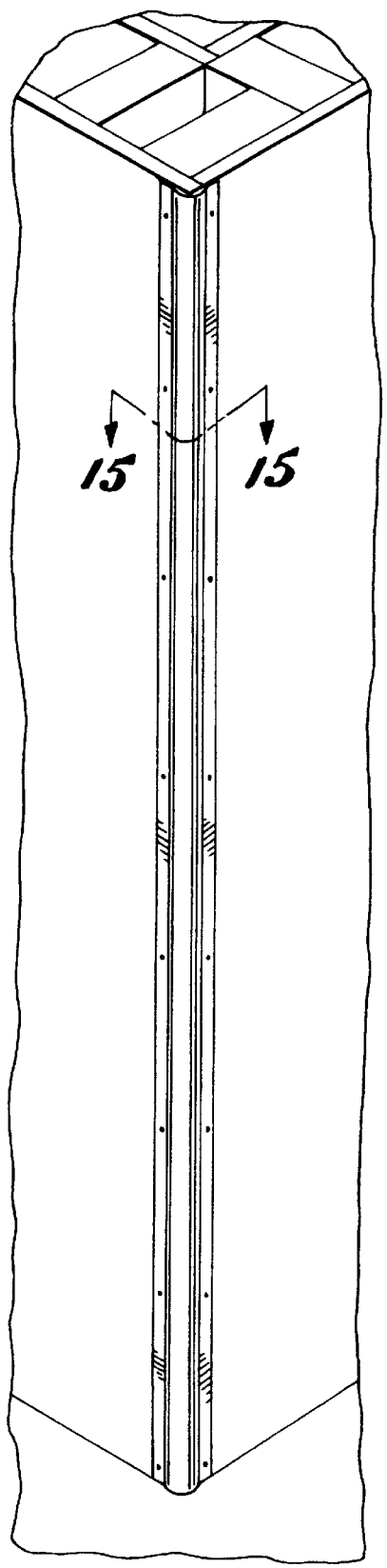
FIG. 14 is a perspective view of a pair of drywall panels which have their joined corners covered by the device of the present invention.
Figure 13:
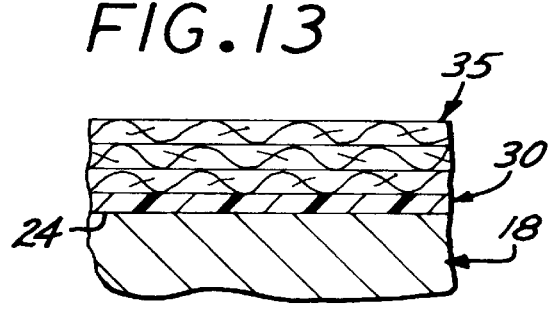
FIG. 13 is a cross-sectional view of the trim device of the present invention.
Figure 15:
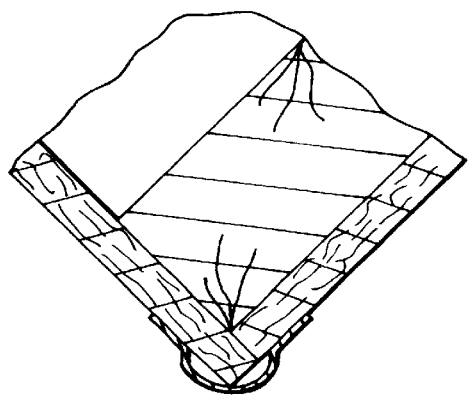
FIG. 15 is a horizontal sectional view, in enlarged scale, taken along tie lines 15—15 of FIG. 14.

Referring to FIGS. 11 and 12, the elongated core 18 may be constructed of any desired rigid material such as metal, plastic or even hard paper. It may be of any configuration known to those skilled in the art, such as flat, angular or J-shape. For the purpose of illustration, I show a corner section 20 from which two angular flanges 22 diverge outwardly. The corner section 20 and the angular flanges 22 of the core 18 are configured with smooth outer and inner surfaces, 24 and 26 respectively, and in one embodiment, the core 18 is metallic and formed using galvanized steel which has been surface treated with a zinc coating. There are many and varied embodiments of this basic corner bead core design having various shapes and dimensions that are well known in the art, from which a workman may choose based on the construction task at hand and his or her individual preferences. Generally, these embodiments may be characterized as having either a hard-line or soft-line design.

For example, FIGS. 11 and 12 depict the forming of a soft line design of the present invention, and more particularly, a bullnose configuration. These figures suggest only a representative embodiment of the design of the present invention as it is contemplated that the corner bead may take many forms having variously shaped corners and angular flanges of differing dimensions and angles to accommodate the relative positioning of the drywall sheets and the shape of the corner to which the trim device is being applied.

Referring now to FIG. 6, adhered to the outwardly facing surface of the core 18 by a hot melt glue or other suitable adhesive layer 30 is the pre-shrunk covering strip 35. It is known that commercially available stock paper can serve as a covering strip material, but only for limited applications. The shortcoming of such use of stock paper is that, when exposed to elevated temperatures at about 100° F., the paper covering tends to become dehydrated and shrink relative to the core causing it to separate from such core, particularly along any irregularities in the core surface.

It is believed that, under extremely dry environmental conditions, the paper may become dehydrated causing it to shrink. It is believed that, as moisture evaporates from the paper, the fibers of the paper shrink and draw together, shrinking the paper along its width and length. As this shrinking occurs, the relative difference in area between the core and paper will cause tension to be applied to certain of the paper fibers, and when the combined tension exceeds a certain magnitude, it will cause the adhesive bond between the paper and the core to pull apart at its weakest point, particularly in areas of surface irregularities such as those that form indentations at one side of a rib or a rounded section in the core. In some instances, the tension resulting from such shrinkage will be applied unevenly causing the paper cover to break the bond with the core in certain areas, which results in such paper bubbling up or sometimes just rupturing, leaving an open fissure to the bare core.

Elevate d temperatures and dry conditions are particularly prevalent in summer weather and the effect is compounded when the beads or other trim devices are stored in an unventilated storage shed or in direct sunlight. Any resultant irregularities, whether from bubbling up, separation or rupture lead to a loss of product due to the resultant imperfection. Should the imperfections not be discovered until after the trim is installed at the construction site, the inefficiencies an d loss of time are exacerbated.

Accordingly, the cover strip 35 of the present invention, in a preferred embodiment, consists of a stock paper that has been heated, dehydrated, and bonded to the core in such dehydrated state. It is also contemplated that the cover strip may take the form of any durable fibrous covering layer that is well suited for use in such drywall construction applications. Obviously, there are benefits derived from selecting a paper having characteristics similar to that of the paper covering the surface of the drywall panel being trimmed so that joint cement applied to both papers will react similarly thus tending to produce a similar appearance for the compound covering both. The cover strip 35 may be shrunk by heating in an oven and/or by hot air blowers, or by other suitable heating means that may initially heat the paper in rolled form. In some instances, heat will also be applied to such paper as it is being unrolled to be adhered to the metallic core 18. As will be appreciated by those skilled in the art, the cover strip may be specially manufactured for the present invention based on the needs of the individual user and the application, or may be selected from a suitable commercially available stock paper know well to those in the industry. It is contemplated that such paper will be procured in rolled form, having appropriate thickness and width for large scale production.

As shown in FIG. 6, after the paper cover strip 35 has been heated, it is bonded to a similarly heated metal or other suitable material comprising the core element 18 by glue or other appropriate bonding means. Referring now to FIGS. 9 and 12, to ensure that the cover strip is reliably affixed to the core element, in a preferred embodiment, the paper cover strip 35 is procured or cut to a width slightly greater than that of its underlying supporting core 18 to thus provide an overhang beyond both lateral edges. This overhang is then folded over the sides of the core and bonded to the inner surface 26 of the core 18, or more specifically, the corresponding respective flange 22. One embodiment incorporates a strip three inches wide and 0.05 inches thick.

In operation, it will be appreciated that the corner bead of the present invention is formed by manufacturing a covering strip 35, or procuring one that is suitable and commercially available, and adhering it to an appropriate metallic or plastic core 18. In the case of a corner bead 50, the combination is then formed to the desired shape. It is also contemplated that such a pre-shrunk cover strip 35 may also be procured or manufactured, and then cut to be complementally mated with a core element 18 that has been pre-formed to its desired shape. This process and result may be accomplished by any number of methods using readily available equipment components known to those skilled in the art. One such method is shown in FIGS. 1 and 2.

Figure 1:
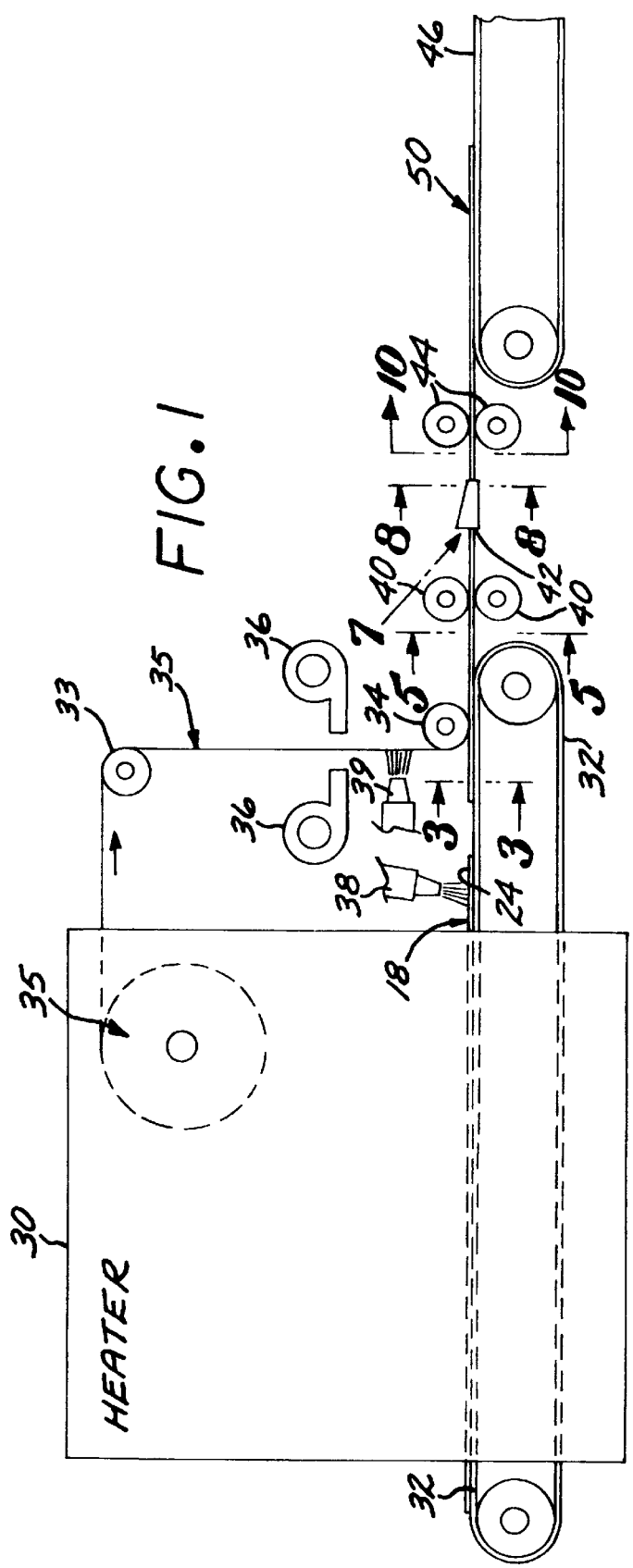
FIG. 1 is a diagrammatic view of a method of making the trim device of the present invention.
Figure 2:
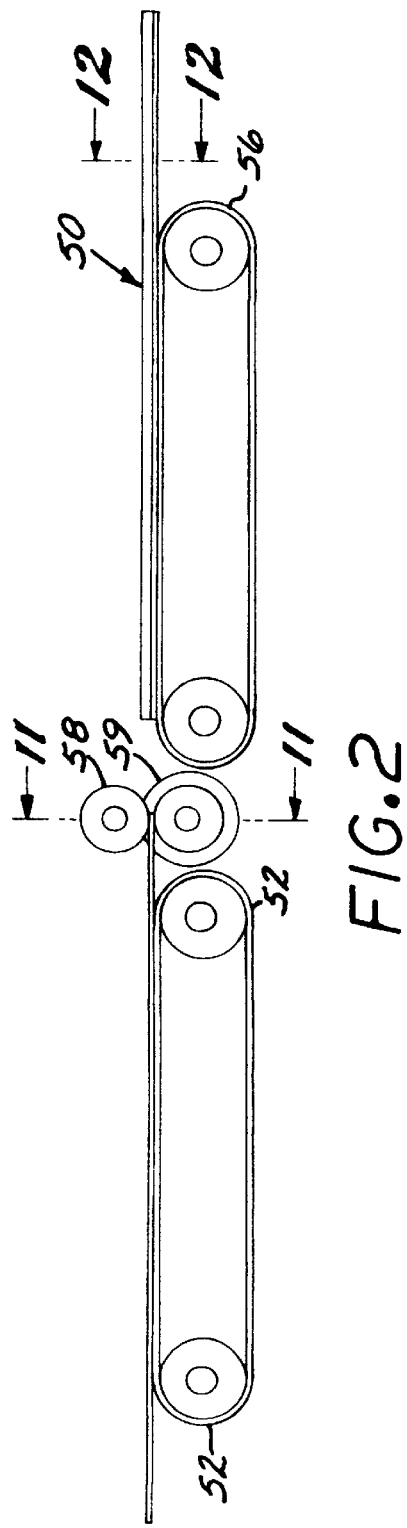
FIG. 2 is a diagrammatic view in enlarged scale of a step in the manufacturing process shown in FIG. 1 in which the section of a trim device is formed into a desired general shape.

Referring to FIG. 1, the covering strip 35 is fabricated from conventional paper of the type often used to cover the surface of conventional drywall panels. The strip 35 is cut to the desired width and is typically rolled in a roll 36 for convenient storage and transportation. The roll 36 may be placed in a heater to heat the paper to an elevated temperature for a predetermined period of time, such as above 100°, preferably in the range of 125° to 160°, for about eight hours. This typically produces about a 3% shrinkage, typically reducing the weight of a 34 pound roll to about 33 pounds. When the manufacturing process is to be initiated, the heated roll 36 will be removed from the heating oven, as by a forklift or the like, and mounted on the assembly line. If desirable, the assembly line mount can incorporate a heater 30 like that shown in FIG. 1 to positively maintain the elevated temperature above about 100° F.

With continued reference to FIG. 1, a suitable hard core 18 of workable dimension is chosen and placed on a heater delivery conveyor 32 to be transported through the heater 30. When the heated core passes out of the heater element, its outer surface 24 is treated on its top side with an adhesive, preferably a hot melt glue, that is sprayed from a core glue gun 38. The cover strip 35 is unrolled from the roll to be fed over an upper guide roller 33 to then pass between a pair of confronting hot air blowers 36 to provide heating redundancy and to ensure that the paper cover strip 35 is maintained in a uniformly heated and dehydrated state. The heated paper cover strip is then treated on its inner surface with a hot melt glue sprayed from a glue gun 39. It will be appreciated that, at this point in the process, the paper cover strip has been maintained heated and dehydrated to maintain its pre-shrink state to be affixed to the core element. The core element 18, as shown in FIGS. 3 and 4, has been heated and treated on its outer surface 24 with an adhesive layer 30.

As the core element 18 continues along the heater delivery conveyor 32, a lower guide roller 34 acts to position and redirect the paper cover strip 35 as required to marry it with the core 18 passing therebelow. As shown in FIG. 1 and more particularly FIG. 5, the layers then pass through a pair of pinch rollers 40 that press the heated core 18 and cover strip 35 together to assist in further bonding the layers while the hot melt glue 30 begins to dry and further bond the layers, as shown in FIG. 6.

If the desired application calls for the paper cover strip to be wrapped around the opposite edges of the core 18, the trim device 50 is passed telescopically through a funnel shaped folder 42. In this embodiment, a paper cover strip 35 is chosen with a width slightly greater than that of the core element 18. As the layers enter the proximate end of the folder 42, the edges of the paper cover strip extending beyond the width of the core engage the inwardly angled walls of the folder, as shown in FIG. 7, thereby directing the paper radially inwardly and folding it around the core 18 where the adhesive layer on the inner surface of the paper acts to bond the pre-shrunk cover strip 35 to the upper surface of the core 18, as shown in FIG. 9. The corner bead 50 is then passed through a second set of pinch rollers 44, as shown in FIG. 10, to further bond the cover strip to the core with the strip edges folded thereunder. The corner bead may then be passed to a transport conveyor 46 for further processing, where the paper may be cut as desired to conform to the ends of the core 18. It is also contemplated that a workman may tear such strip off to conform to the core by using the edge of the core as a shear.

Referring now to FIG. 2, the respective core 18 with the cover strip 35 married thereto, can then be placed on a forming conveyor 52 and passed through forming rollers, 58 and 59, to shape the bead to the desired cross sectional configuration, as for instance the bullnose configuration shown in FIGS. 11 and 12. The forming rollers are stacked in a complemental manner permitting the trim device 50 to pass therebetween, and consist of an appropriately shaped and mating upper female and lower male roller, 58 and 59 respectively. The formed corner bead may then be passed onto a finishing conveyor 56 and delivered to workmen or subsequent machine components that cut the bead to the desired length and stack and store it for shipping.

It is also contemplated that large sheets of the desired core element may be manufactured along with large conforming sheets of covering strip material that may then be adhered to such sheets to form large sheets of the corner bead of the present invention. These sheets may then be cut to form individual corner beads of any desired dimension and shaped as desired.

Once the various embodiments of the present invention have been thusly manufactured, a workman will select the appropriate corner bead depending on his or her preferences and the drywall construction task at hand. The workman will then attach the corner bead to the drywall corners by applying a joint compound to the drywall surface and embedding the formed metallic core in the compound. It is also contemplated that embodiments of the present invention may include paper wings that extend beyond the flanges to assist in securing the corner bead in place, which can be accomplished by electing not to fold the paper cover strip over its corresponding flange and affixing it to the inner surface of the core, as shown in FIG. 9. In an alternative embodiment, the covering strip 35 may be formed by combining multiple layers of pre-shrunk paper. This multiple-layer design affords greater strength to the overall covering strip, while also making it less susceptible to rupturing, bubbling, and separation from the core element 18 that may result from exposure to changes in humidity or exposure to elevated temperatures. Additionally, the multiple-layer design affords the covering strip 35 redundancy in its resistance to scuffing, abrasion, and water penetration, uniformly protecting the covering strip throughout its thickness.

The cover strip 35 may be pre-shrunk in any desirable fashion, such as by application of heat or application of dry air or various combinations thereof. The term pre-shrunk used herein is intended to mean any form or manner of shrinking the covering strip as presently known or which may be developed in the future, it only being important that the cover strip is pre-shrunk and maintained it in its shrunken condition while the bonding step takes place.

Once fabricated, the trim device may be stored in inventory or shipped to the construction site. As described above, it is expected that the cover strip may absorb moisture from the atmosphere expanding the paper fibers. This serves to actually create a reserve of contraction capability in that, when and if subsequently dehydrated, the network of fiber may shrink back to the pre-shrunk state as it existed at the time of bonding. Further shrinking below that state will also be accommodated without generating sufficient tension to break the bond of the glue affixing such strip to the core.

From the foregoing, it will be apparent that the trim device of the present invention provides a reliable, durable, and aesthetically pleasing means for forming a terminus or corner finish in drywall construction. The covering strip 35 mounted to the elongated metallic core 18 is designed and manufactured to be resistant to separation from the core element. By pre-shrinking the cover strip material layer before it is adhered to the core, the cover is less likely to undergo shrinking, rupturing, or bubbling due to prolonged exposure to ambient environmental cycles or elevated temperatures, thus further enhancing the permanence of the bond to the core and the aesthetics of its appearance.

Various modifications and changes may be made with regard to the foregoing detailed description without departing from the spirit of the invention.

What is claimed is:

1. A drywall trim device comprising:
   a hard core constructed with flanges for overlapping the marginal edges of drywall panels abutted together and having respective exterior surfaces;
   a pre-shrunk cover strip of fiber material having an inner bond surface juxtaposed said exterior surfaces and responsive to a selective amount of dehydration to shrink and reduce said bond surface to a selected shrunken area; and
   a bond bonding said bond surface to the respective said exterior surfaces and operative to cooperate with said hard core to constrain said bond surface to said selected shrunken area.

2. The drywall trim device of claim 1 wherein:
said bond is a hot melt adhesive.

3. The drywall trim device of claim 1 wherein:
said pre-shrunk cover covers the entire said surface of said flanges.

4. The drywall trim device of claim 1 wherein:
said core is formed with opposite lateral edges; and
said pre-shrunk cover strip projects laterally beyond said edges and is folded over said edges.

5. The drywall trim device of claim 1 wherein:
said pre-shrunk cover strip is formed from a stock paper.

6. The drywall trim device of claim 1 wherein:
said pre-shrunk cover strip is formed from Kraft paper.

7. The drywall trim device of claim 1 wherein:
said core is formed from galvanized steel.

8. The drywall trim device of claim 1 wherein:
said core is configured with said flanges extending laterally at right angles to one another.

9. The drywall trim device of claim 1 wherein:
said core is formed with a rounded corner interposed between said flanges.

10. The drywall trim device of claim 1 wherein:
said cover strip is formed having multiple layers of pre-shrunk paper.

11. The drywall trim device of claim 1 wherein:
said cover strip is pre-shrunk by heating it to 100° F. or more for approximately eight hours.

12. The drywall trim device of claim 1 wherein:
said core is constructed of metal.

13. The drywall trim device of claim 1 wherein:
said cover strip is shrunk by dehydration.

14. The drywall trim device as set forth in claim 1 wherein:
said cover strip is dehydrated by heating.

15. The drywall trim device as set forth in claim 1 that includes:
drywall panels having said marginal edges overlapped by said flanges and including covering paper underlying said flanges.

16. A drywall bead device for dry wall construction prepared by a process, including the following steps:
selecting a hard core having an outer surface;
selecting a stock paper of the type to be dehydrated a selected amount to be shrunk sufficiently to reduce one side thereof to a selected shrunken area to be used as a covering strip;
dehydrating said strip said selected amount to a pre-shrunk stip with said one side of said selected shrunken area; and
bonding said one side of said pre-shrunk grip to said outer surface to constrain the interface between said strip and cover to said selected shrunken area.

17. A drywall bead device for dry wall construction prepared by a process, including the following steps;
selecting a hard core having an outer surface;
selecting a paper to be used as a covering strip;
dehydrating and heating such strip to shrink it to a pre-shrunk condition with a bond surface thereof of a selected shrunken area; and
bonding such strip in said pre-shrunk condition to said exterior surface of such core to constrain the interface between said strip and core to an area corresponding with said selected shrunken area.

18. The drywall bead device of claim 16 wherein:
said strip is dehydrated at a temperature of at least 100° F.

19. The drywall bead device of claim 16 wherein:
said strip is dehydrated for substantially 8 hours.

20. The drywall bead device of claim 16 wherein:
said strip is dehydrated for substantially 8 hours at a temperature of at least 100° F.

21. A drywall trim device comprising:
an elongated rigid core formed with an outwardly facing core surface; and
a moisture absorptive fiber cover strip on said core surface and having an inwardly facing bond surface, said cover strip being at the time of manufacture, dehydrated below atmospheric humidity to a shrunken condition and, while so shrunken, said bond surface bonded to said core surface area such that upon rehydration from said shrunken condition said bond surface will be constrained from expansion.

22. A preshrunk drywall trim device comprising:
a hard core constructed with flanges for overlapping the marginal edges of drywall panels abutted together and having respective exterior surfaces;
a cover strip of moisture absorptive fiber material characterized in that it is responsive to dehydration to preshrink to a shrunken state, said cover strip having an interior bond surface juxtaposed the respective exterior surfaces and, in such dehydrated state, occupying a selected shrunken area; and
a bond bonding said bonding surface to the respective said exterior surfaces to constrain said bonding surface to said selected shrunken area irrespective of hydration and dehydration of such cover.

* * * * *